Aug. 18, 1959  E. E. PARTIN  2,899,775
GRASS PROTECTION DEVICE
Filed Aug. 2, 1957

INVENTOR.
EARL E. PARTIN,
BY
McMorrow, Berman + Davidson
ATTORNEYS

United States Patent Office 2,899,775
Patented Aug. 18, 1959

2,899,775

GRASS PROTECTION DEVICE

Earl E. Partin, Ypsilanti Mich.

Application August 2, 1957, Serial No. 675,837

3 Claims. (Cl. 47—1)

This invention relates to a ground engaging device and, more specifically, the present invention pertains to a ground engaging device for protecting growing grass.

One of the primary objects of this invention is to provide means for protecting growing grass from damage resulting from pedestrian and/or vehicular traffic.

Another object of this invention is to provide a ground engaging device for protecting growing grass from damage wherein the weight of the traffic is borne on the device and is transferred to the subsurface of the earth.

Another object of this invention is to provide a device of the type referred to supra, which is non-complex in construction and assembly, inexpensive to manufacture, and durable in use.

Other and further objects and advantages of this invention will become more evident from a consideration of the following specification when read in conjunction with the annexed drawing, in which.

Figure 1:
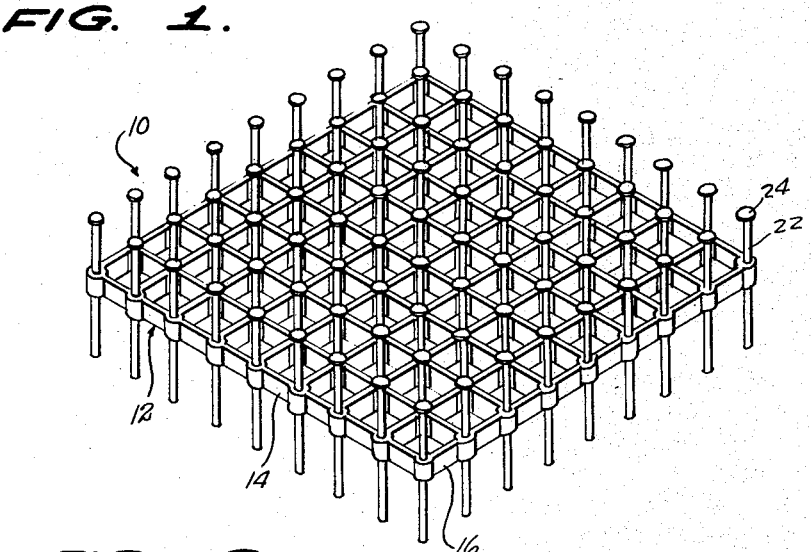
Figure 1 is a perspective view of a ground engaging device constructed in accordance with the teachings of this invention and being adapted to prevent damage to growing grass.
Figure 2:
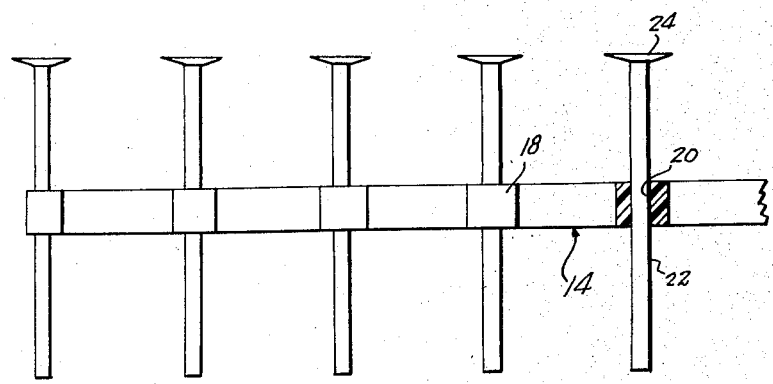
Figure 2 is an enlarged fragmentary side-elevational view, partly in cross-section, of the device illustrated in Figure 1.

Referring now more specifically to the drawing, reference numeral 10 designates, in general, a grass protecting device constructed in accordance with the present invention. As illustrated therein, the device 10 is seen to comprise a lattice-type substantially rectangular frame 12 which may be made of metal, plastics, or of any other suitable material. The frame 12 comprises a plurality of relatively thin substantially rectangular intersecting rank and file elements 14 and 16, respectively. The elements 14, 16 intersect each other at substantially right angles in enlarged bosses 18 each of which is provided with a longitudinally extending bore 20.

Each of the bosses 18 receive therethrough an elongated pin 22 having an enlarged head 24 at one end thereof. Any conventional means may be utilized to fixedly secure the pins, intermediate their respective ends, within their respective associated bosses 18.

If desired, the frame 12 and the headed pins 22 may be integrally constructed as a unit.

Figure 3:
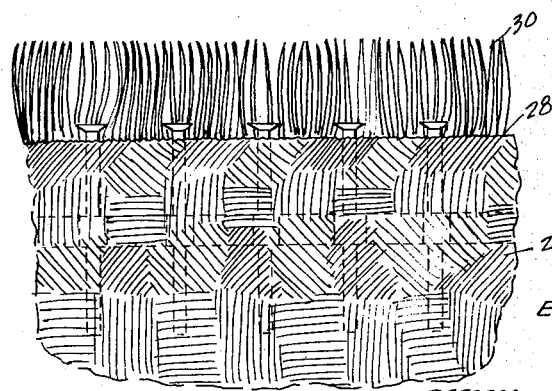
Figure 3 illustrates the device of Figure 1 in its operative position in the earth's subsoil.

The grass protecting device is inserted into the subsoil 26 in the manner illustrated in Figure 3 with the heads 24 and disposed proximate to and in vertically spaced relation relative to the earth's surface 28. In this position, pedestrian or vehicular traffic across the grass blades 30 immediately adjacent the heads 24 will cause the blades 30 to bend or flex under the weight thereof. However, the weight of the traffic is transferred to the protecting device 10 thus preventing damage to the roots of the grass blades 30 which would normally be the consequence in the absence of the protecting device.

Having described and illustrated one embodiment of this invention in detail, it will be understood that the same is offered merely by way of example, and that the invention is to be limited only by the scope of the appended claims.

What is claimed is:

1. A grass root protecting device comprising a plurality of relatively thin substantially rectangular intersecting rank and file elements, said rank and file elements being disposed at right angles with respect to each other and intersecting at an enlarged boss having a bore extending transversely therethrough, and a headed pin extending through each of said bores and fixedly secured within said bosses intermediate the ends of said pins.

2. A grass protecting device comprising a main body formed of a plurality of substantially rectangular rank members and a plurality of substantially rectangular file members, said rank members and said file members intersecting one another, a plurality of pins extending through said main body at said intersections of said rank and file members, one end of each of said pins being provided with a foot engaging head portion, and said main body being embedded in soil and said ends of said pins having said head portions secured thereto projecting above the surface of said soil in order to provide support for vehicular or pedestrian traffic thereacross.

3. A grass protecting device comprising a main body formed of a plurality of substantially rectangular rank members and a like plurality of substantially rectangular file members, said rank members and said file members being positioned substantially at right angles relative to one another and intersecting one another at enlarged bosses, each of said bosses being provided with a bore extending transversely therethrough, a plurality of substantially cylindrical pins extending through said bores in said bosses, one end of each of said pins being provided with a substantially discoidal foot engaging head portion, and said main body portion being embedded in turf and said ends of said pins having said head portions secured thereto projecting above the surface of said turf in order to provide support for vehicular or pedestrian traffic thereacross.

References Cited in the file of this patent

UNITED STATES PATENTS

| 763,503 | McGregor | June 28, 1904 |
| 2,551,846 | Martin | May 8, 1951 |
| 2,571,483 | Pope | Oct. 6, 1951 |

FOREIGN PATENTS

| 155 | Great Britain | of 1889 |
| 14,851 | Switzerland | July 9, 1897 |